(12) United States Patent
Anderson et al.

(10) Patent No.: US 7,568,118 B2
(45) Date of Patent: Jul. 28, 2009

(54) DETERMINISTIC OPERATION OF AN INPUT/OUTPUT INTERFACE

(75) Inventors: Warren R. Anderson, Westborough, MA (US); Maurice B. Steinman, Marlborough, MA (US); Richard M. Watson, Harvard, MA (US); Horst W. Wagner, Northborough, MA (US); Christopher C. Gianos, Sterling, MA (US); Suresh Balasubramanian, Shrewsbury, MA (US); Tim Frodsham, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 11/231,273

(22) Filed: Sep. 20, 2005

(65) Prior Publication Data

US 2007/0067514 A1   Mar. 22, 2007

(51) Int. Cl.
*G06F 13/42* (2006.01)
*H04L 5/00* (2006.01)
(52) U.S. Cl. ............. 713/400; 713/401; 713/500; 713/501; 713/502; 713/503; 713/600; 713/601; 710/70; 710/310
(58) Field of Classification Search .......... 710/310, 710/70; 713/400, 401, 500–503, 600, 601
See application file for complete search history.

(56) References Cited

U.S. PATENT DOCUMENTS

| | | | | |
|---|---|---|---|---|
| 5,655,113 A | * | 8/1997 | Leung et al. | 713/401 |
| 5,710,910 A | * | 1/1998 | Kehl et al. | 713/400 |
| 6,009,488 A | | 12/1999 | Kavipurapu | 710/105 |
| 6,134,155 A | * | 10/2000 | Wen | 365/189.04 |
| 7,145,831 B2 | * | 12/2006 | Goller et al. | 365/233 |
| 7,216,194 B2 | * | 5/2007 | Solomon et al. | 710/310 |
| 2002/0087909 A1 | * | 7/2002 | Hummel et al. | 713/400 |
| 2002/0199124 A1 | * | 12/2002 | Adkisson | 713/400 |
| 2004/0068626 A1 | * | 4/2004 | Alpert et al. | 711/158 |
| 2004/0213074 A1 | * | 10/2004 | Johnson et al. | 365/233 |
| 2005/0055489 A1 | * | 3/2005 | Elliott | 710/310 |
| 2005/0262336 A1 | * | 11/2005 | Cherukuri et al. | 713/2 |
| 2005/0286507 A1 | * | 12/2005 | Sterling et al. | 370/363 |

(Continued)

FOREIGN PATENT DOCUMENTS

DE   1004011672 A1 * 10/2005

(Continued)

OTHER PUBLICATIONS

"Asynchronous Interconnect for Synchronous SoC Design" by Andrew Lines, IEEE Micro, Jan.-Feb. 2004.*

(Continued)

*Primary Examiner*—Henry W. H. Tsai
*Assistant Examiner*—Steven G Snyder
(74) *Attorney, Agent, or Firm*—Trop, Pruner & Hu, P.C.

(57) ABSTRACT

In one embodiment, the present invention includes a method for receiving data from a second device in a first device, forwarding the data from an input/output (I/O) clock domain to a system clock domain of the first device, and providing the data to a functional unit of the first device at a deterministic time. In such manner, the two devices may operate in lockstep fashion. Other embodiments are described and claimed.

21 Claims, 5 Drawing Sheets

U.S. PATENT DOCUMENTS

2006/0020843 A1* 1/2006 Frodsham et al. ........... 713/503

FOREIGN PATENT DOCUMENTS

| EP | 678990 A2 * | 10/1995 |
|---|---|---|
| WO | WO 2006056904 A2 * | 6/2006 |
| WO | WO 2007029168 A2 * | 3/2007 |

OTHER PUBLICATIONS

'An FPGA Design of AES Encryption Circuit With 128-bit Keys' by Qin et al., Proceedings of the 15th ACM Great Lakes Symposium on VLSI', Apr. 2005.*

U.S. Appl. No. 10/850,783, filed May 21, 2004, entitled "Methods and Apparatuses for Resetting the Physical Layers of Two Agents Interconnected Through a Link-Based Interconnection" by Naveen Cherukuri, Sanjay Dabral, David S. Dunning, Tim Frodsham, and Theodore Z. Schoenborn.

U.S. Appl. No. 10/897,225, filed Jul. 21, 2004, entitled "A Technique to Create Link Determinism" by Tim Frodsham, Michael Tripp, David O'Brien, Navada Muraleedhara, Naveen Cherukuri, Sanjay Dabral, David Dunning, and Theodore Schoenborn.

"Does asynchronous logic design really have a future?" Shekhar Borkar. EE Times. Jun. 6, 2003. http://www.eetimes.com/story/OEG20030606S0037.

* cited by examiner

DETERMINISTIC OPERATION OF AN INPUT/OUTPUT INTERFACE

BACKGROUND

Embodiments of the present invention relate to data communication and more particularly to deterministic data transfer between connected devices.

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices are coupled to the same bus. Accordingly, it is easy to read or write to devices on the same bus. However, as bus interface speeds increase, bus architectures are moving away from multi-drop architectures towards point-to-point architectures. In point-to-point architectures, peer-to-peer communication becomes more difficult as synchronization, ordering, and coherency of such communications becomes more difficult. One example of a point-to-point architecture is a PCI Express™ architecture in accordance with the PCI Express Base Specification, Rev. 1.0 (published Jul. 22, 2002).

Communication between serially connected devices typically involves buffering data to be sent in a transmitting device and then sending the data, for example, in packetized form to a receiving device. The two communicating devices, which may be different integrated circuits of a system, are typically connected via off-chip links to communicate data between the devices. Such links can be used for inter-processor communication or communication from an agent to memory, as two examples. Often data from a clock-forwarded off-chip interface can arrive at an agent such as a processor (and more particularly into a processor's core) non-deterministically, that is, at an arbitrary execution cycle. Non-deterministic operation can cause various problems. For example, debug of an integrated circuit on a high-speed tester becomes difficult if the chip does not respond identically each time test code is run. Likewise, debug on a system platform becomes difficult if the chip contains intrinsic execution uncertainties. Also, scan techniques such as restart/replay can become confused. Furthermore, it is impossible to create a lockstep system, where two processors operate side-by-side and constantly compare results. A need thus exists for improved system operation, including deterministic transmission of data.

DETAILED DESCRIPTION

In various embodiments, deterministic operation of a clock-forwarded (i.e., source-synchronous) input/output (I/O) interface may be provided. As used herein, deterministic operation refers to the arrival of data at a functional unit of a processor, microcontroller, or other agent at a known cycle relative to some fixed event, for example, a de-assertion of a reset signal that initiates execution of code in the agent.

Using embodiments of the present invention, a device such as a processor including one or more cores, memory, an I/O system and other functionality (collectively a processor), is not sensitive to non-determinism at an input, such as at the processor's pins. While a processor may contain multiple non-phase-aligned clock domains with on-chip clock-forwarded (source-synchronous) interfaces between them, transfer of data between these domains may occur deterministically. Thus data transfers may be insensitive to both an absolute delay between domains and to dynamic variations in the phase difference between the domains.

To achieve determinism regardless of a static cycle-based uncertainty with regard to receive data at an agent's input, properties of one or more initialization protocols may be used to embed information that allows logic in an I/O portion of the agent to examine the incoming data and adjust the latency through the I/O portion based on the incoming data.

Across on-chip clock-forwarded interfaces between clock domains, first-in first-out (FIFO) buffers may be used to achieve deterministic data transfer. On a receive side, initialization of a FIFO (i.e., release of a FIFO load pointer) may occur with a looped-back version of a selected signal, such as a reset signal. Release of a FIFO unload pointer, on the other hand, may be controlled from the domain that generates the original version of the selected (e.g., reset) signal, which guarantees determinism across this clock domain crossing.

Figure 1:
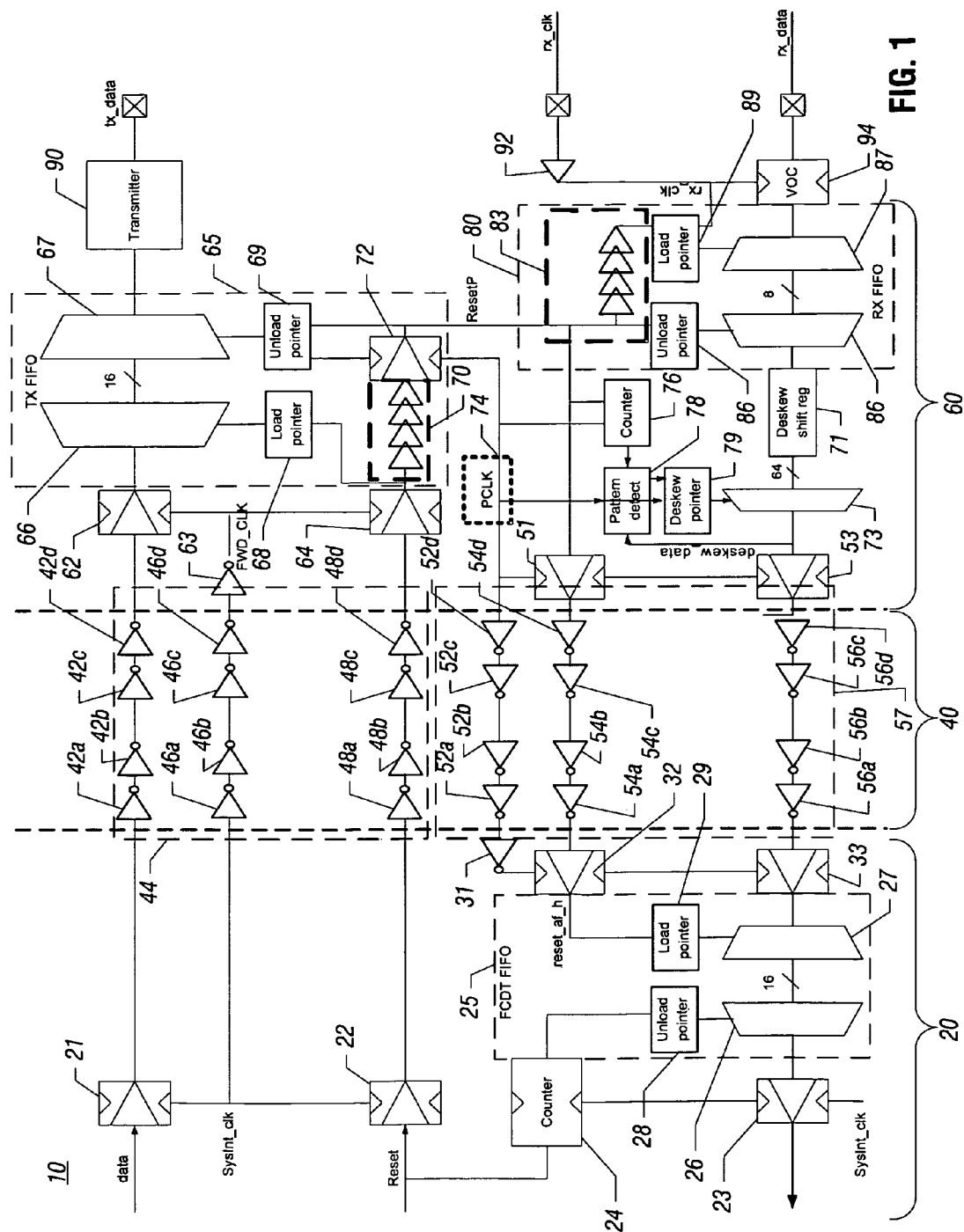
FIG. 1 is a block diagram of a portion of a device in accordance with one embodiment of the present invention.

Referring now to FIG. 1, shown is a block diagram of a portion of a device in accordance with one embodiment of the present invention. More specifically, FIG. 1 shows a block diagram of on-chip components of an I/O portion of a device such as a bus agent coupled to an off-chip link. While a bus agent may take various forms, in some embodiments the bus agent may be a processor, controller, I/O hub, bridging agent or the like. As shown in FIG. 1, an I/O system 10 of an agent includes various components. Groups of these components may form different clock domains of the I/O system. While described herein as different components, it is to be understood that one or more such components may be handled by the same or similar hardware for performing the desired functionality.

As shown in FIG. 1, a system interface 20 (on the left side of FIG. 1) represents the data interface into a networking link and higher layers of the agent. For example, inter-processor data may interface with a networking router (not shown in FIG. 1), while memory data may interface with a memory controller (not shown in FIG. 1). These two entities pass data to other parts of the device, including one or more execution cores or other core logic. System interface 20 may operate at a first clock domain which corresponds to a system interface domain. As one example, system interface 20 may operate using a fractional clock data transfer (FCDT) domain.

Still referring to FIG. 1, a routing path 40 of I/O system 10, which may include a transmit path 44 and a receive path 57, may be an on-chip clock-forwarded interface to couple different clock domains together. Thus routing path 40 may provide routing between system interface 20 and an I/O physical layer 60. Because these two entities are physically distant from one another, this on-chip clock-forwarded interface provides for data transfer between them. The transfer mechanism of routing path 40 may dramatically reduce power compared to a full-chip single clock domain solution. However, in other embodiments, such an on-chip clock-forwarded interface may not be present, and data may pass directly from a system interface to an I/O physical layer, in some embodiments. In addition to data, it is to be understood that routing path 40 may additionally provide a path for routing of additional signals, including clock signals, control signals, a reset signal and the like.

I/O physical layer 60 operates at a different clock domain than system interface 20. Specifically, I/O physical layer 60 may operate at a clock domain based upon a received clock signal, which may be received from another device, such as another processor or other agent. I/O physical layer 60 includes I/O circuitry and logic to transmit to and receive data from an off-chip interconnect. The transmit path is shown along the top of FIG. 1, while the receive path is shown along the bottom of FIG. 1.

In certain components of I/O system 10, non-determinism may be caused by analog delays that vary with process, voltage and temperature (PVT). For example, routing path 40 may have delays that vary with PVT. Similarly, off-chip links to which I/O system 10 are coupled also may have non-deterministic analog delay that varies with PVT. Still further, a clock of I/O physical layer 60 (e.g., PCLK 74) may also display analog delay non-determinism, in some embodiments. Other parts of I/O system 10 may have discrete cycle non-determinism. That is, these portions may have propagation delays that may vary for each reset event. However, using embodiments of the present invention, upon initialization the non-determinism may snap to one of several possible cycles. As examples, a synchronizer 70 of a transmit FIFO 65 and a synchronizer 83 of a receive FIFO 80 may have such determinism.

As shown in FIG. 1, data to be transmitted from an agent is provided to system interface 10 via a latch or flip-flop 21. Flip-flop 21 is controlled by a system interface clock (i.e., SysInt_clk) to pass the data through routing path 40. Specifically, data sent from flip-flop 21 is provided through a delay line formed of a plurality of inverters 42a-42d to I/O physical layer 60. Similarly, the system interface clock is also provided through routing path 40 to I/O physical layer 60 through a delay line formed of a plurality of inverters 46a-46d.

System interface 10 also receives a reset signal, which is passed though a flip-flop 22 and is provided to routing path 40. Through routing path 40, the reset signal is passed through a delay line formed of a plurality of inverters 48a-48d and provided to I/O physical layer 60. As further shown in FIG. 1, the reset signal is also coupled to a counter 24, which in turn is coupled to a receive FIFO 25 (also referred to herein as an FCDT FIFO).

Still referring to the transmit path of I/O system 10, from routing path 40 data to be transmitted is passed through a flip-flop 62 and into a transmit buffer 65 that includes a plurality of storage registers (two of which are shown as a first register 66 and a second register 67 in FIG. 1). Transmit buffer 65 is controlled through two independent pointers, one for loading of data and one for unloading of the data. As shown in FIG. 1, a load pointer 68 is used to load data into a selected one of the registers. Load pointer 68 is controlled via the delayed reset signal, received at load pointer 68 from a flip-flop 64 synchronized by a forwarded clock (FWD_CLK) obtained via an inverter 63. Data is unloaded from a selected register of buffer 65 according to an independently controlled unload pointer 69. Unload pointer 69 is controlled by a signal, ResetP, obtained from a flip-flop 72 coupled to a synchronizer 70, which in turn is coupled to receive the forwarded reset signal via flip-flop 64. Data output from transmit FIFO 65 is coupled through a transmitter 90 and is provided to an output pin (i.e., tx_data).

In a clock-forwarded interface, I/O inputs include data pins and a clock pin. The clock pin continuously toggles, providing edges indicating when data is valid. On-chip circuits receive, distribute, and phase align the incoming forwarded clock to data receivers, where it is used to capture the incoming data. Because of PVT delay variations in a transmitter, the phase of the incoming clock and data at the receiver, and therefore the phase of the receive clock, may vary with respect to the phase of the I/O logic clock (PCLK 74 in FIG. 1) and core logic clock (sysint_clk of FIG. 1) in the receiver. Where two clocks have the same average frequency but are not aligned with a known phase relationship, a mesochronous system exists. Likewise, the term mesochronous can also be used to describe any system where clocks are aligned with a maximum phase deviation, including those with variable frequency.

Still referring to FIG. 1, incoming data from an off-chip link is provided to I/O system 10 via data pads, one of which is shown in FIG. 1 as coupled to receive data (rx_data). I/O system 10 further is coupled to receive a forwarded clock from the off-chip link. As shown in FIG. 1, this forwarded clock (i.e., rx_clk) is provided through a pin and a buffer 92. The incoming data is coupled through a flip-flop 94 controlled by the incoming clock and is provided to a receive FIFO 80. Receive FIFO 80 includes a plurality of storage registers to store data received via off-chip links. As shown in FIG. 1, receive FIFO 80 includes a first register 87 and a second register 86 (of course additional registers may also be present). As further shown in FIG. 1, receive FIFO 80 is controlled through two independent pointers, one used for loading of data and one for unloading of data. A load pointer 89 is synchronous with the receive clock domain (i.e., rx_clk), advancing when new data is ready to be loaded. In contrast, an unload pointer 88 is synchronous with the device's core clock domain, advancing when it is ready to see new data. Thus as shown in FIG. 1, unload pointer 88 is controlled by the synchronized reset signal (ResetP), discussed above. In various embodiments, receive FIFO 80 further includes a synchronizer 83 to transfer the synchronized reset signal to unload pointer 88 and initialize it. De-assertion of the reset signal starts the pointers advancing. Because the phase relationship between rx_clk and PCLK 74 is arbitrary, synchronizer 83 may thus resolve potential metastability issues in the rx_clk domain upon a transition of reset.

Provided unload pointer 88 follows load pointer 89 with adequate margin, the two domains can successfully transfer data. For example, FIFO 80 may load data into register 6 while unloading data from register 2. Load pointer 89 can advance to load data into register 7 whenever new data is ready based on the incoming forwarded clock independently from unload pointer 88 advancing to read data from register 3, based on its timing. The deviations of the phases of the two clocks should be limited to prevent the pointers from advancing past each other. In the case of a fixed clock frequency, deviations from the average frequency are to be limited. If one clock's frequency is greater than the other clock's frequency for long enough, it could still cause the load and unload pointers to cross, but this situation can be analyzed and solved through good clock frequency control. In a system with variable frequency, the phases of the two clocks should track with limited phase deviations between the two clocks.

Still referring to FIG. 1, received data is passed from FIFO 80 through a deskew shift register 71 and a buffer 73. From there, serial data is coupled through a flip-flop 53, which in turn is coupled through routing path 40 via a delay line formed of a plurality of inverters 56a-56d. The received data is then passed through a flip-flop 33 and is provided to FIFO 25, which includes a plurality of storage registers, two of which are shown in FIG. 1 as a first register 26 and a second register 27. Furthermore, FCDT FIFO 25 includes an independently controlled unload pointer 28 and a load pointer 29. The data output from FIFO 25 is passed through a flip-flop 23 and is provided to the other circuitry of the agent.

Load pointer 29 is controlled by a forwarded (i.e., looped back) version of the synchronized reset signal, ResetP, generated in synchronizer 70. More specifically, the synchronized reset signal, ResetP, is provided via a flip-flop 51 and a reset delay path of routing path 40 via a plurality of inverters 54a-54d and through a flip-flop 32 (as reset_af_h) to control load pointer 29. Unload pointer 28, in contrast, is controlled by counter 24 which receives the direct version of the reset signal. Flip-flop 32 is in turn controlled by a looped-back version of the I/O logic clock signal (PCLK 74) via a delay line formed of a plurality of inverters 52a-52d.

As will be discussed further below, along the receive data path, incoming data is provided to a pattern detect circuit 78 as deskew_data. Pattern detect circuit 78 is also coupled to receive a clock signal from PCLK 74 and a count value from a counter 76. In turn, pattern detect circuit 78 controls a deskew pointer 79, which in turn controls the unloading of received data from buffer 73. In such manner, an appropriate delay may be added to the data path to resolve static cycle-based uncertainty.

In a given system, lack of determinism may arise from four main causes, in part from the clocking architecture used for a large device and in part from the intrinsic characteristics of a clock-forwarded I/O interface. As illustrated in FIG. 1, data arriving from off-chip into I/O system 10 crosses between a receiving clock domain and the I/O logic clock domain (via receive FIFO 80). Second, this data passes through another clock domain crossing between I/O physical layer 60 and core logic (i.e., system interface 20). Third, transmit data must cross from the core clock domain into the I/O logic clock domain (i.e., transmit FIFO 65 of FIG. 1). Fourth, delays in the on-chip receive and transmit data paths will vary with process, voltage, and temperature conditions. Embodiments of the present invention may overcome these causes to yield deterministic, lockstep operation.

In various embodiments, an I/O system may provide deterministic operation whereby instructions and data appear at a core or other logic at a known execution cycle that is reproducible every time the device is powered on. To provide for deterministic operation, it may first be noted that an I/O system is not sensitive to non-determinism at the agent's pins. That is, no part of the system examines the "state" of the pins. Although in a functioning system the data at the pins is captured by a receiving chip, the I/O interface does not examine this data. Instead, it merely passes the data to a system interface, which does examine it. Therefore, transmit uncertainties do not matter as long as they can be compensated for in the logic receiving the uncertain timed data. Even a high-speed functional tester, which captures and examines a device's outputs, will not be sensitive to some amount of uncertainty in the data transmitted to it. These testers capture data from the device, but do not respond to it. They simply provide a pre-programmed sequence of bits to the device's input pins while receiving data from the device's outputs, which is then compared with an expected sequence. More sophisticated testers can align data received from the device to the expected sequence, adjusting the alignment based on an expected pattern that occurs during initialization of the I/O link. Appearance of output data to the tester at a pre-determined tester cycle is therefore not necessary.

Accordingly, some amount of non-determinism may be permitted in the transmit data path. Thus, along with data provided from system interface 20 to I/O physical layer 60, the delay-matched reset wire formed of inverters 48a-48d within path 40 may be used to release load pointer 68 of transmit FIFO 65, as discussed above. This synchronously propagated reset signal releases load pointer 68 and is also provided to a synchronizer 70 and another flip-flop 72, where it is passed into the PCLK domain, and releases unload pointer 69. The cycle uncertainty through synchronizer 70 can cause the output data to appear at a different absolute cycle with each power up of the device, however nothing is sensitive to absolute time determinism at the output pins. Upon release of unload pointer 69, output data from transmit FIFO 65 is coupled through a transmitter 90 and is provided to the output pins (one of which is shown in the embodiment of FIG. 1).

In the transmit direction, the delay variation with PVT of the on-chip forwarded clock path from system interface 20 to I/O physical layer 60 through routing path 40 may be handled in one of two ways depending on the clock configuration in I/O physical layer 60. In one implementation, PCLK 74 is derived from an independent off-chip source that is mesochronous with the on-chip forwarded clock. In this case, the on-chip data path delay will result in a phase variation of up to approximately one cycle between the two clocks. As long as unload pointer 69 trails load pointer 68 by at least this amount, the phase variation will be absorbed in transmit FIFO 65. In the other implementation, PCLK 74 is derived from FWD_CLK through a phase-locked loop (PLL). In this case, there will only be a small amount of variation, much less than one cycle, between FWD_CLK and PCLK 74. The delay variation in the on-chip forwarded clock path will appear as variation in the timing of the output data. This variation will not be common between the transmitted forward clock, appearing at the inputs of a receiving device and that device's I/O clock. Therefore, the transmit data's PVT variation may be absorbed in the receiving device's receive FIFO. Because FIFOs (i.e., transmit FIFO 65 and a receiving device's receive FIFO) absorb the dynamic timing variation, data transmitted from I/O system 10 will arrive at an I/O system of the receiving device with only static cycle-based uncertainty that occurs through the initialization of transmit and receive FIFOs.

Figure 2:
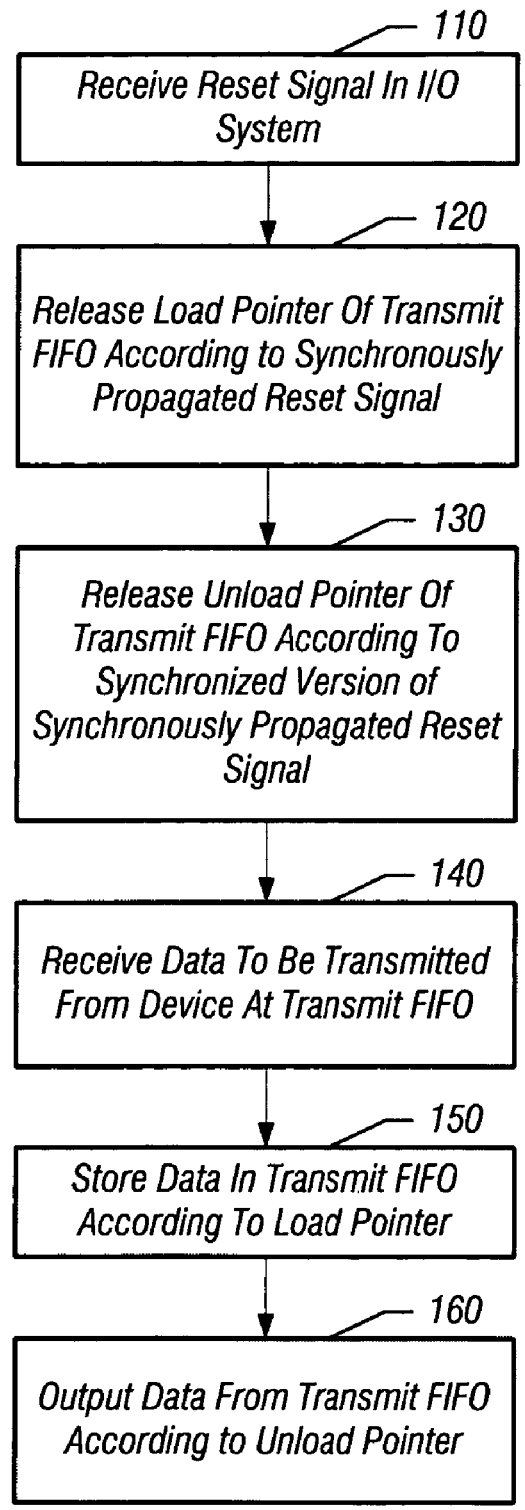
FIG. 2 is a flow diagram of a method of controlling a transmit data path in accordance with an embodiment of the present invention.

Referring now to FIG. 2, shown is a flow diagram of a method of controlling a transmit data path in accordance with an embodiment of the present invention. As shown in FIG. 2, method 100 may begin by receiving a reset signal in an I/O system of a device (block 110). While described in the embodiment of FIG. 2 as being a reset signal, it is to be understood that in various embodiments any one of a number of selected control or status signals may be used for effective transmit path determinism.

Still referring to FIG. 2, next a load pointer of a transmit FIFO may be released according to a synchronously propagated reset signal (block 120). For example, the reset signal received in the I/O system may be synchronously propagated to an I/O physical layer in which the transmit buffer resides. Next, an unload pointer of the transmit FIFO may be released according to a synchronized version of the synchronously propagated reset signal (block 130). That is, the propagated reset signal may pass through a synchronizer chain of the I/O physical layer before it releases the unload pointer, to remove the potential of metastability. In doing so, the delay of a rising or falling edge though the synchronizer may vary by one or more cycles. In various embodiments, independently controlling the unload pointer to trail the load pointer by at least an amount equal to a phase variation between the clock domain of the device's core logic and the I/O physical layer's clock domain may provide for deterministic behavior. Accordingly, the transmit buffer is ready to load and unload data to be transferred.

Thus still referring to FIG. 2, the transmit FIFO may receive data to be transmitted from the device (block 140). For example, such data may be sent from a core of the device (e.g., a processor core) and through a system interface portion of the I/O system (and in some embodiments a routing path) to the transmit buffer of the I/O physical layer. This data may be stored in the transmit FIFO in a register pointed to by the load pointer (block 150). Finally, the data may be output from the transmit FIFO under control of the unload pointer (block 160).

Referring back to FIG. 1, to create determinism in a receive data path, FCDT FIFO 25 may be appropriately controlled. The initialization of FIFO 25 (i.e, release of load pointer 29) occurs via a looped-back version of the reset signal (reset_af_h) received from routing path 40 from I/O physical layer 60. This causes the FIFO load to be totally deterministic with respect to reset de-assertion in I/O physical layer 60. For example, receive data sent to system interface 20 eight cycles after reset de-assertion in I/O physical layer 60 will always be placed in entry eight of FIFO 25. More generally, I/O input data from cycle N will always be placed in FIFO entry N modulo the depth of FIFO 25.

Release of unload pointer 28, on the other hand, may be controlled from system interface 20, which guarantees determinism across this clock domain crossing. One implementation is for reset de-assertion in the system interface 20 to start a counter running in system interface 20. When counter 24, which receives the reset signal, reaches a predetermined or trigger value, it releases unload pointer 28. In various embodiments, the trigger value may be slightly larger than the longest round trip delay for the reset signal to travel from system interface 20 to I/O physical layer 60 and back to release load pointer 29. Thus, load pointer 29 releases prior to unload pointer 28, for proper FIFO operation. In these embodiments, the total depth of the FIFO 25 may have a depth sufficient to cover dynamic variation (drift) plus initialization uncertainties in the path traveled by the reset signal.

FIFO 25 may thus be completely deterministic for I/O physical layer 60 to system interface 20 data transfers, regardless of PVT variations in the on-chip clock-forwarded path delays. For example, assume counter 24 is set to release unload pointer 28 twelve cycles after reset de-asserts in system interface 20. Suppose further that it takes eight cycles for reset to make its round trip and release load pointer 29. I/O data placed in FIFO entry zero will be stored eight cycles after reset de-asserts in system interface 20, but will be unloaded twelve cycles after reset de-asserts. Now suppose on another device it takes ten cycles for reset to make this round trip. Data will thus be placed in FIFO entry zero ten cycles after reset de-asserts in system interface 20, but still unloaded in cycle twelve. As demonstrated, the distance between the load and unload pointers is irrelevant and data transfer from I/O physical layer 60 to system interface 20 is deterministic with respect to reset de-assertion in both regions.

Figure 3:
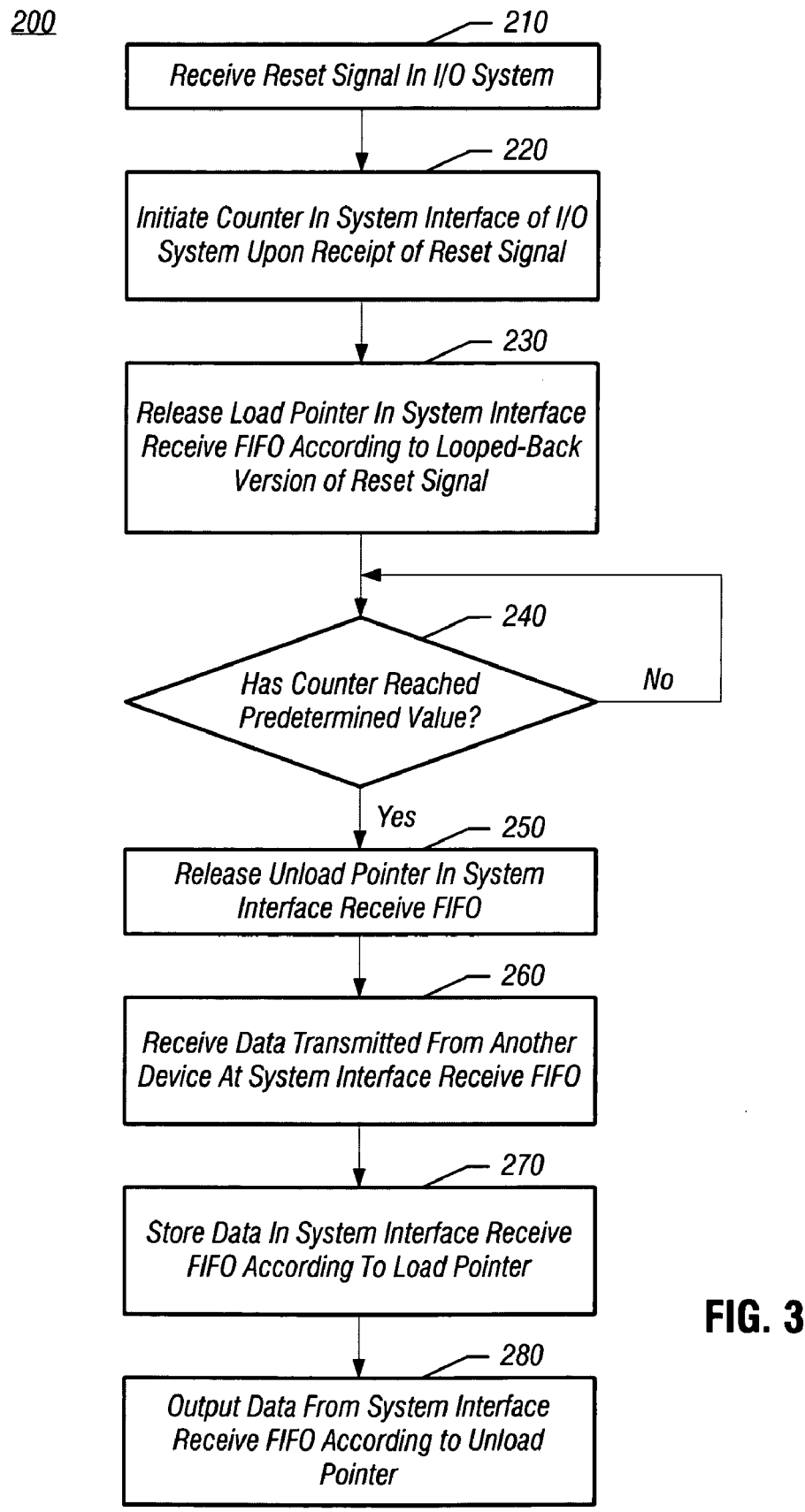
FIG. 3 is a flow diagram of a method of controlling a receive data path of a device in accordance with an embodiment of the present invention.

Referring now to FIG. 3, shown is a flow diagram of a method of controlling data flow in a receive data path of a device in accordance with an embodiment of the present invention. As shown in FIG. 3, method 200 may begin by receiving a reset signal in an I/O system (block 210). While described in the embodiment of FIG. 3 as being a reset signal, it is to be understood that in various embodiments any one of a number of selected control or status signals may be used for effective receive path determinism. Next a counter in the system interface portion of the I/O system may be initiated upon receipt of the reset signal (block 220). As will be described further below, this counter may be used to control release of an unload pointer of a receive FIFO.

Still referring to FIG. 3, next a load pointer of the receive FIFO may be released according to a looped-back version of the reset signal (block 230). This looped-back reset signal is a propagated version of the reset signal having passed from its initial receipt at the system interface through a routing path (if present) and into the I/O physical layer of the I/O system, and then routed in a feedback fashion back to the system interface, where it is used to release the load pointer.

Next, it may be determined whether the counter has reached a predetermined value (diamond 240). In various embodiments, the predetermined value may be a trigger count at which a trigger signal is sent from the counter. In various embodiments, the predetermined value may be at least equal to the round-trip delay for the reset signal to loop back (as discussed above) to the system interface portion. If not, a loop occurs until the counter reaches its trigger value. Next, an unload pointer of the receive FIFO may be released under control of a trigger signal from the counter (block 250). Accordingly, the load and unload pointers of the receive FIFO are independently controlled. Accordingly, data transfer between the I/O physical layer and the system interface of the I/O system is deterministic with respect to de-assertion of the reset signal.

As a result, incoming data to a device may be received and stored in a receive FIFO of the system interface deterministically. Specifically, data received from another device is provided to the system interface receive FIFO (block 260). As discussed above, this data may be received from another agent, such as another processor of a multiprocessor system and be passed through an I/O physical layer and through a routing path (if present) into the system interface receive FIFO. This received data may then be stored in the system interface receive FIFO at a location pointed to by its load pointer (block 270). Finally, the data may be output from the system interface receive FIFO to core logic of the agent according to the unload pointer (block 280).

To resolve static cycle-based uncertainty of receive data, discussed above, properties of an initialization protocol may be used to embed information that allows logic in an I/O system to examine incoming data and adjust the latency through the I/O system. At a high-level, as part of link initialization a certain value or sequence of values may be expected on an input data bus Q cycles after reset de-asserts. Logic in the I/O system may be used to examine the incoming data around this time. If the logic detects the expected data value (s) too early, it can add cycles to the data path through the I/O system until the actual delay matches the expected delay of Q cycles. If instead, the expected data values are detected too late, the I/O system may be reset and initialization may be performed again with a longer target latency Q.

Figure 4:
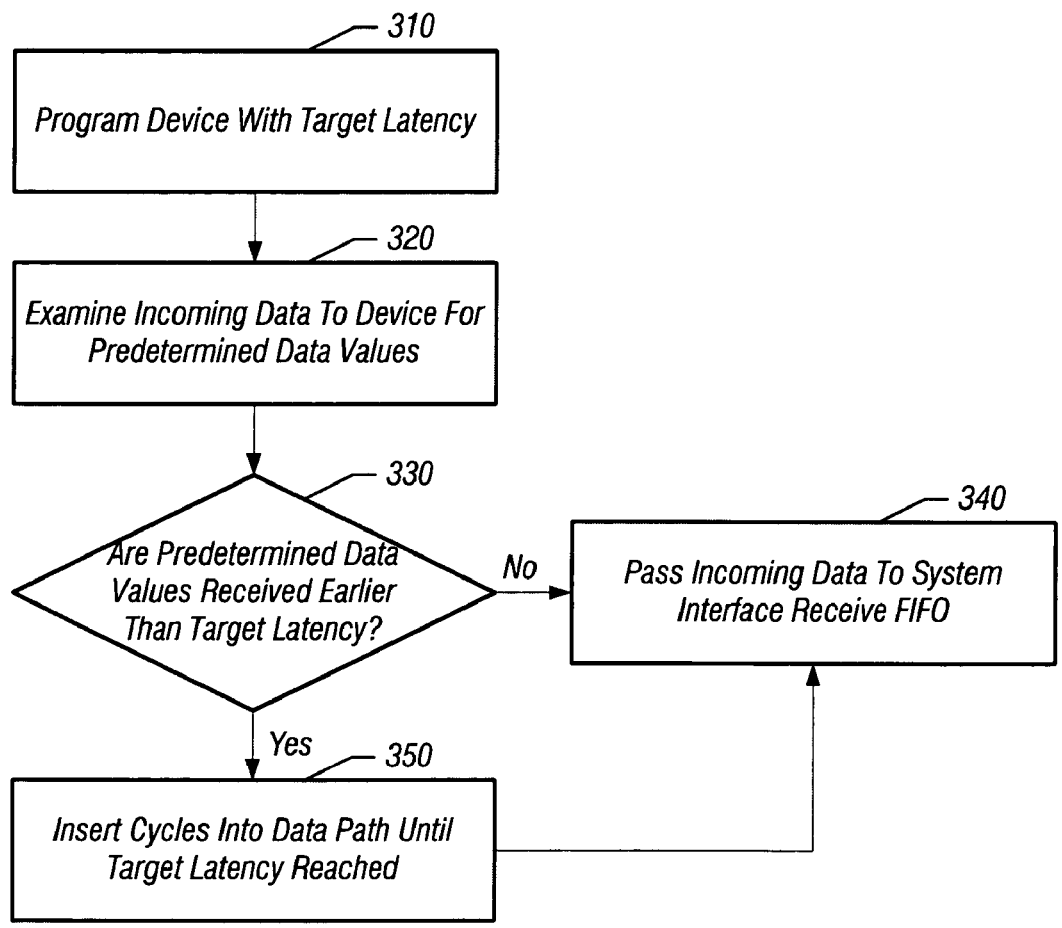
FIG. 4 is a flow diagram of a method of resolving cycle-based non-determinism in accordance with one embodiment of the present invention.

Referring now to FIG. 4, shown is a flow diagram of a method of resolving cycle-based non-determinism in accordance with one embodiment of the present invention. As shown in FIG. 4, method 300 may be performed during initialization of a device, and more specifically during link initialization. During link initialization, training data and certain expected data patterns may be sent from a transmitting device to a receiving device. Before the receipt of such data, the receive device may be programmed with a target latency (i.e., an expected delay) (block 310). For example, the receive device may be programmed according to a target link latency stored in a command and status register (CSR) of the device.

Then, incoming data may be examined for one or more predetermined data values (block 320).

Next, it may be determined whether the data values were received earlier than expected (diamond 330). That is, it may be determined whether the data values were received earlier than the programmed target latency of the device. If not, the incoming data may be passed to receive chain circuitry. For example, the incoming data may be passed to a system interface portion of an I/O system, and more particularly to a receive FIFO (block 340).

If instead at diamond 330 it is determined that the expected data values are received earlier than expected, control may pass to block 350. There, one or more cycles may be inserted into the data path until the expected delay (i.e., the target latency) is reached (block 350). Then control passes to block 340.

While discussed with these particular operations in the flow diagrams of FIG. 2-FIG. 4, it is to be understood that in other embodiments, different manners of effecting deterministic behavior may be performed.

In one implementation, which may be used in a system implementation employing a point-to-point protocol interconnect protocol, a clock boundary indicator (CBI) counter cycles every 200 megahertz (MHz), representing the cycle of alignment with respect to the input reference clock. Although described with specific values for this particular embodiment for purposes of illustration, the scope of the present invention is not so limited. The value at which the counter wraps back to zero (i.e., the maximum value stored in the counter), Nmax-1, depends on the frequency of the I/O system. For example, the value may be 9 for 4.0 gigabits per second (Gb/s) operation, 11 for 4.8 Gb/s, and 15 for 6.4 Gb/s. Part of this initialization protocol allows the CBI on the transmit device and the target link latency, stored in a CSR, to be sent to the receiving device. The receiving device may then add the transmit device's CBI and the target link latency and take that result modulo Nmax. This result may be compared to the CBI on the receiving device. If the data comes too early, I/O logic may add pipe latch stages to the data until the correct CBI is reached. In such manner, this mechanism effectively links together the CBI values on the transmit and receive devices.

For example, consider the case of two components (A and B) where the target link latency is 24 cycles and Nmax is 16. Assume component A communicates a CBI value of 4 during link initialization, and it is received in component B with its count value equal to nine. To match the target link latency of 24 cycles, component B would need to receive the CBI value when its counter had a value of 4+24 MOD 16, or at a value of twelve. Since it was actually received at a count value of nine in this example, three extra cycles (i.e., 12−9) of latency may be injected by B's receiver to match the target latency.

In the embodiment shown in FIG. 1, incoming data may be provided as deskew_data to pattern detect circuit 78. Pattern detect circuit 78 may look for the target link latency value and the CBI value received from a sending device. Furthermore, pattern detect circuit 78 may receive a CBI value of the device and another value from counter 76. Based on these values, pattern detect circuit 78 may determine whether additional latency cycles should be inserted into the received data path. Accordingly, pattern detect circuit 78 may provide control signals to deskew pointer 79, which in turn may be used to control the output of received data from buffer 73 accordingly.

In an implementation employing a fully buffered dual in-line memory module (DIMM) (FBD) architecture, since the memory channel always responds in a fixed number of cycles from the packets transmitted by the processor (fixed at initialization, but may vary from system to system, and from reset to reset), deterministic memory latency may be achieved by counting the number of cycles from command to response during initialization. This count is compared to the target latency, and additional delay may be added as described above.

Figure 5:
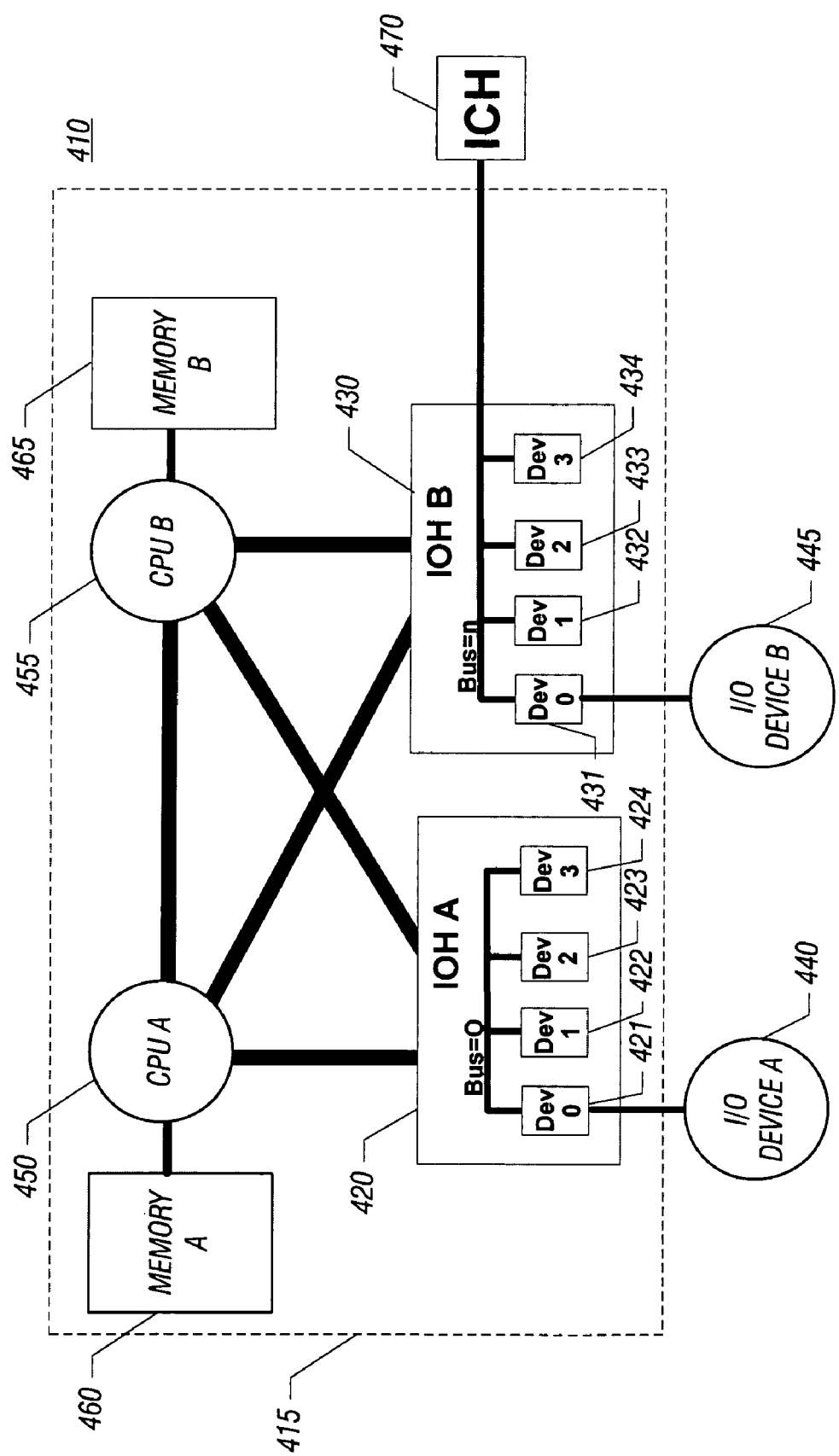
FIG. 5 is a block diagram of a system in accordance with one embodiment of the present invention.

Referring to FIG. 5, shown is a block diagram of a system in accordance with one embodiment of the present invention. As shown in FIG. 5, system 410 may be a multiprocessor system including a coherent interface in accordance with an embodiment of the present invention. That is, system 410 may represent any one of a desired desktop, mobile, server or other such platform, in different embodiments. In certain embodiments, interconnections between different components of FIG. 5 may be point-to-point interconnects that provide for coherent shared memory within system 410, and in one such embodiment the interconnects and protocols used to communicate therebetween may form a coherent system. In such manner, multiple processors, memories, and other components of system 410 may coherently interface with each other.

Referring to FIG. 5, system 410 may include a first processor 450 (CPU A) and a second processor 455 (CPU B). In various embodiments, each processor may include memory controller functionality such that the processors may directly interface with an associated shared memory via a point-to-point interconnect. For example, as shown in FIG. 5, processor 450 may be coupled to a memory 460 (memory A) via a point-to-point interconnect and processor 455 may be coupled to a memory 465 (memory B) via a similar point-to-point interconnect. More so, processors 450 and 455 may be coupled to each other via a point-to-point interconnect. Using embodiments of the present invention, deterministic arrival of data between processors 450 and 455 may occur. Accordingly, these processors may operate in a lockstep manner in which the processors operate concurrently and continually compare results of certain operations. Similarly, each of processors 450 and 455 may be coupled via point-to-point interconnects to each of a first input/output (I/O) hub (IOH A) 420 and a second IOH 430 (IOH B).

In the embodiment of FIG. 5, all components within box 415 may collectively form a coherent system (i.e., coherent system 415). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 460 and 465 may be reserved for non-coherent transactions. While the embodiment of FIG. 5 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 5, I/O hubs 420 and 430 may each include a plurality of ports (e.g., ports 421-424 in IOH 420 and ports 431-434 in IOH 430) to interface with I/O devices coupled thereto. For example, in certain embodiments, such I/O devices may be devices in accordance with one or more bus schemes. In one embodiment, such I/O devices may be PCI Express™ devices. For simplicity, FIG. 5 shows a single I/O device coupled to each I/O hub, namely I/O device (I/O device A) 440 coupled via port 421 to IOH 420 and I/O device (I/O device B) 445 coupled via port 431 to IOH 430. It is to be understood that the number of ports in an I/O hub in accordance with an embodiment of the present invention may vary, and the number of ports and devices coupled thereto shown in FIG. 5 are for illustrative purposes only.

Also shown in FIG. 5 is a legacy I/O controller hub (ICH) 470 coupled to IOH 430. In one embodiment, ICH 470 may be used to couple legacy devices such as a keyboard, mouse, and Universal Serial Bus (USB) devices (e.g., devices in accordance with the USB Specification Rev. 2.0 (published December 2000)) to coherent system 415.

While the I/O hubs shown in FIG. 5 include a plurality of ports, it is to be understood that the hubs may realize various functions using a combination of hardware, firmware and software. Such hardware, firmware, and software may be used so that the I/O hub may act as an interface between coherent system 415 (e.g., shared memories 460 and 465, processors 450 and 455, and IOHs 420 and 430), and devices coupled thereto such as I/O devices 440 and 445. In addition, the I/O hubs of FIG. 5 may be used to support various bus or other communication protocols of devices coupled thereto. IOH 420 and IOH 430 may act as agents to provide a central connection between two or more communication links. In particular, IOH 420 and IOH 430 may be high-speed link agents that provide a connection between different I/O devices coupled to coherent system 415. In various embodiments, other components within coherent system 415 may also act as such agents.

In various embodiments, each port of I/O hubs 420 and 430 may include a plurality of channels, often referred to herein as "virtual channels" that together may form one or more virtual networks and associated buffers to communicate data, control and status information between various devices. In one particular embodiment, each port may include up to at least six such channels.

Further, while discussed herein as being used within a coherent system, it is to be understood that other embodiments may be implemented in a non-coherent system to provide for deadlock-free routing of transactions. In some embodiments, the channels may keep traffic separated through various layers of the system, including, for example, physical, link, and routing layers, such that there are no dependencies.

Embodiments may be implemented in a computer program. As such, these embodiments may be stored on a medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read only memories (ROMs), random access memories (RAMs) such as dynamic RAMs (DRAMs) and static RAMs (SRAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a general-purpose processor or a custom designed state machine.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving data from a second device in a first device;
   forwarding the data from an input/output (I/O) clock domain to a system clock domain of the first device through a routing path including a delay line;
   loading the data into a buffer of the system clock domain according to a load pointer, wherein the load pointer is controlled by a looped-back reset signal received in the system clock domain from the I/O clock domain via the routing path, the looped-back reset signal received in the I/O clock domain from the system clock domain via the routing path and from a reset signal initiated in the first device; and
   unloading the data from the buffer and into a functional unit of the first device according to an unload pointer, wherein the unload pointer is controlled by an unload signal based upon the reset signal.

2. The method of claim 1, further comprising generating the unload signal when a counter initiated by the reset signal reaches a trigger value.

3. The method of claim 2, wherein the trigger value is greater than a round trip delay for propagation of the looped-back reset signal from the system clock domain to the I/O clock domain and back to the system clock domain to the load pointer.

4. The method of claim 1, further comprising programming a data path of the first device with a target latency.

5. The method of claim 4, further comprising:
   detecting a pattern in the data received from the second device; and
   determining if the pattern is received at the target latency.

6. The method of claim 5, further comprising inserting at least one cycle into the data path if the pattern is received earlier than the target latency.

7. The method of claim 5, wherein determining if the pattern is received at the target latency comprises comparing a clock count and a transmit target latency received from the second device with a receive clock count.

8. The method of claim 1, further comprising routing the looped-back reset signal via a clock-forwarded interface between the I/O clock domain and the system clock domain.

9. An article comprising a machine-accessible medium including instructions that when executed cause a system to:
   load data to be transmitted from a device into a buffer according to a load pointer, wherein the load pointer is controlled by a load signal obtained from a synchronously propagated signal received via a delay path, wherein the synchronously propagated signal is synchronized by a clock signal of the device;
   unload the data from the buffer according to an unload pointer, wherein the unload pointer is controlled by a unload signal obtained from a synchronized version of the synchronously propagated signal; and
   transmit the data from the device via an interconnect to a second device for deterministic delivery of the data to a functional unit of the second device.

10. The article of claim 9, further comprising instructions that when executed cause the system to provide the data to the buffer via the delay path.

11. The article of claim 10, further comprising instructions that when executed cause the system to transfer the data from a first clock domain associated with a system interface of the device to a second clock domain associated with an input/output physical layer of the device including the buffer.

12. An apparatus comprising:
a first clock domain of a first agent corresponding to a core logic clock domain, the first clock domain including a first receive buffer;
a second clock domain of the first agent coupled to the first clock domain by a routing path to couple the first clock domain and the second clock domain, the routing path including a plurality of delay lines, the second clock domain corresponding to an input/output (I/O) logic clock domain, the second clock domain to be coupled via a link to a second agent; and
a signal path to route a signal from the first clock domain to the second clock domain and back to the first clock domain through the routing path via a first delay line and a second delay line, wherein a load pointer for the first receive buffer is to be released by the signal when routed back to the first clock domain, and an unload pointer for the first receive buffer is to be released under control of the signal before it is routed to the second clock domain.

13. The apparatus of claim 12, wherein the routing path comprises a clock-forwarded interface.

14. The apparatus of claim 12, wherein the signal path comprises the first delay line coupled between the first clock domain and the second clock domain and the second delay line coupled between the second clock domain and the first clock domain.

15. The apparatus of claim 12, further comprising logic to program a target latency of the apparatus.

16. The apparatus of claim 15, wherein the logic is to adjust a cycle latency of a data path to the first receive buffer based on analysis of a latency of incoming data.

17. The apparatus of claim 12, wherein the first agent comprises a processor and the first clock domain and the second clock domain comprise an I/O portion of the processor.

18. A system comprising:
a first agent having a first input/output (I/O) interface;
a second agent having a second I/O interface including:
an input/output (I/O) logic clock domain to receive data from the first agent; and
a core logic clock domain coupled to the I/O logic clock domain, the core logic clock domain having a receive buffer, wherein the receive buffer is to receive the data from the I/O logic clock domain deterministically with respect to de-assertion of a reset signal in the I/O logic clock domain, the reset signal synchronously propagated to the I/O logic clock domain from the core logic clock domain; and
a point-to-point interconnect to couple the first agent and the second agent.

19. The system of claim 18, wherein data to be transmitted between a transmit buffer of the I/O logic clock domain and a second receive buffer of the first I/O interface is received at a core of the first agent deterministically.

20. The system of claim 18, further comprising a signal path to route a signal from the core logic clock domain to the I/O logic clock domain and back to the core logic clock domain.

21. The system of claim 20, further comprising a load pointer for the receive buffer, the load pointer to be released by the signal when routed back to the core logic clock domain.

* * * * *